(12) United States Patent
Montague et al.

(10) Patent No.: US 8,037,541 B2
(45) Date of Patent: Oct. 11, 2011

(54) SYSTEM, DEVICE AND METHOD FOR INTEROPERABILITY BETWEEN DIFFERENT DIGITAL RIGHTS MANAGEMENT SYSTEMS

(75) Inventors: Paul Montague, Highbury (AU); Brenton Cooper, Glenside (AU)

(73) Assignee: General Instrument Corporation, Horsham, PA (US)

( * ) Notice: Subject to any disclaimer, the term of this patent is extended or adjusted under 35 U.S.C. 154(b) by 1130 days.

(21) Appl. No.: 11/697,342

(22) Filed: Apr. 6, 2007

(65) Prior Publication Data
US 2008/0250508 A1    Oct. 9, 2008

(51) Int. Cl.
*G06F 21/00*    (2006.01)

(52) U.S. Cl. .......... 726/28; 380/200; 380/201; 380/233; 380/241; 713/193; 705/64

(58) Field of Classification Search .................. None
See application file for complete search history.

(56) References Cited

U.S. PATENT DOCUMENTS
2003/0126086 A1*  7/2003  Safadi .............................. 705/51
2004/0062400 A1*  4/2004  Sovio et al. .................. 380/286
2005/0138400 A1*  6/2005  Wu et al. ......................... 713/189
2006/0282391 A1   12/2006  Peterka et al.
2007/0204064 A1*  8/2007  Mail et al. ..................... 709/246

OTHER PUBLICATIONS

David W. Kravitz and Thomas S. Messerges. "Achieving media portability through local content translation and end-to-end rights management," Proceedings of the Fifth ACM Workshop on Digital Rights Management, Alexandria, VA, USA, Nov. 7, 2005.
Brenton Cooper and Paul Montague, "Translation of Rights Expressions," Proceedings of the 2005 Australasian Information Security Workshop (AISW2005), Conferences in Research and Practice in Information Technology, ACS, vol. 44, pp. 137-144, Jan. 2005.

* cited by examiner

*Primary Examiner* — Nasser Moazzami
*Assistant Examiner* — Fikremariam A Yalew
(74) *Attorney, Agent, or Firm* — Stewart M. Wiener

(57) ABSTRACT

A system, device and method for allowing protected content to be transferred to end user communication devices that support different digital rights management (DRM) formats or schemes than the DRM format of the content provider. The method includes providing a Limited Rights Issuer (LRI) that issues content and associated digital rights to one or more of the end user devices within a domain defined by a Domain Authority with which the LRI has registered. The Limited Rights Issuer also translates content and associated digital rights information from the DRM format of an upstream DRM system to the DRM format of a downstream DRM system, which includes the end user devices within the defined domain. The system allows select end user devices to enjoy interoperability of content protected under different DRM schemes, while allowing content providers to still maintain a suitable level of DRM protection for their content.

20 Claims, 3 Drawing Sheets

SYSTEM, DEVICE AND METHOD FOR INTEROPERABILITY BETWEEN DIFFERENT DIGITAL RIGHTS MANAGEMENT SYSTEMS

BACKGROUND OF THE INVENTION

1. Field of the Invention

The invention relates to digital rights management systems and communication devices that receive protected content from such systems. More particularly, the invention relates to methods, devices and systems for allowing end user communication devices to access protected content regardless of which type of digital rights management system issued the digital rights to the protected content and which type of digital rights management system the communication devices support.

2. Description of the Related Art

Many conventional systems and methods exist for transferring digital information from content providers to various end user communication devices. Digital information includes video content, such as movies and programming events, music, and other digital information suitable for transfer from one or more content providers. End user communication devices include set-top boxes and residential gateways, and mobile communication devices, such as personal digital assistants (PDAs) and smart phones. Typically, systems and methods for transferring digital information to various end user communication devices involve some sort of digital rights management (DRM) format or scheme that usually includes encrypting the content to be transferred and providing one or more decryption keys to authorized users or user devices for decrypting the encrypted content.

Different DRM systems and corresponding DRM formats exist for protecting content transmitted to various end user communication devices. For example, current DRM formats or schemes include Windows Media DRM, Motorola Internet Protocol Rights Management (IPRM), and one or more DRM schemes according to or specified by the Open Mobile Alliance (OMA). Conventionally, protected content and associated digital rights and licenses issued from one DRM scheme are not compatible with different DRM formats or schemes and their supporting devices. Therefore, for an end user, protected content from a content provider is accessible only by end user communication devices that support or are compatible with the particular DRM format of the content and the associated digital rights and licenses. Thus, for example, an end user who purchased digital content using their set-top box may not be able to access that particular content using their PDA or smart phone, unless the PDA is compatible with the DRM scheme supported by the set-top box.

Conventional systems and methods either do not allow such transfer or require relatively large infrastructure support and/or processing capability, at both the transmitting and receiving ends of the system.

DETAILED DESCRIPTION

Figure 1:
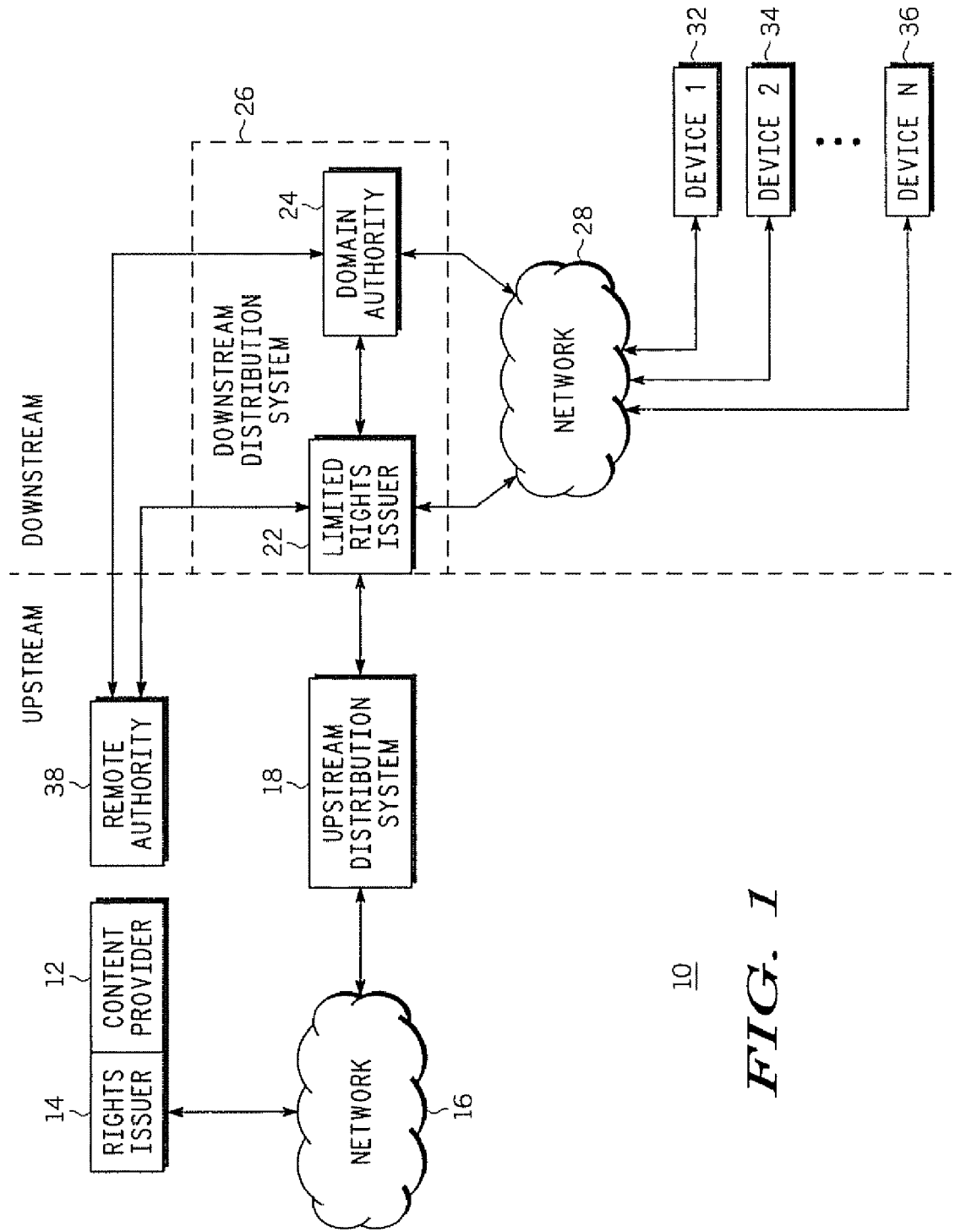
FIG. 1 is a block diagram of a digital rights management system for providing content interoperability between different digital rights management schemes.

In the following description, like reference numerals indicate like components to enhance the understanding of the systems, devices and methods for providing content interoperability between different digital rights management schemes through the description of the drawings. Also, although specific features, configurations and arrangements are discussed herein below, it should be understood that such specificity is for illustrative purposes only. A person skilled in the relevant art will recognize that other steps, configurations and arrangements are useful without departing from the spirit and scope of the invention.

The systems, devices and methods described herein are directed to the interoperability of digital rights management (DRM) content across end user devices that support different DRM protection formats or schemes. Content and associated rights and license terms formatted and provided by an upstream DRM system are made available to one or more end user communication devices in a downstream DRM system, regardless of the particular DRM formats or schemes supported by either the upstream DRM system provider and the downstream end user communication devices. The systems and methods also can define or establish a select domain of downstream end user communication devices that are able to share licenses, thus allowing interoperability to occur only among downstream end user communication devices within the established domain. Therefore, select end user communication devices can enjoy interoperability of content protected under different DRM schemes, while content providers can still maintain a suitable level of DRM protection for their content. The downstream system includes a Domain Authority (DA), which manages the domain of the end user communication devices suitable for receipt of protected content. The downstream system also includes a Limited Rights Issuer (LRI), which is responsible for issuing licenses and other digital rights to one or more of the end user communication devices.

Most systems for transferring digital information to various end user communication devices involve some sort of DRM format or scheme to protect the content being transferred. A DRM scheme usually includes encrypting the content to be transferred and providing one or more decryption keys to authorized users or user devices for decrypting the encrypted content. Conventionally, decryption keys exist in many different forms and can be delivered to and obtained by authorized users and/or user devices in various ways. Often, content decryption involves obtaining a succession of decryption keys, with the availability of each key depending on the acquisition of a previous key. Such encryption typically involves a tiered keying scheme, where high-level or high-tier keys are used to obtain mid-tier keys, and mid-tier keys are used to obtain low-tier keys.

As discussed previously, there is no one preferred or universal DRM format or scheme that is accepted across or compatible with all platforms within a given content distribution system. End users may possess several communication devices for receiving and processing content, each of which may use a different DRM format or system for content protection. Also, end users may desire to transfer content between communication devices that use different DRM formats or schemes. Conventional systems and methods either do not allow such transfer or require a relatively great amount of additional infrastructure support and/or processing capability, usually at both the transmitting and receiving ends of the system. Such requirements increase costs and reduce efficiency within the various conventional content distribution systems.

Referring now to FIG. 1, shown is a block diagram of a digital rights management system 10 for providing content interoperability between different digital rights management schemes. The system 10 includes a content source or provider 12, a content digital rights issuer 14 associated with the content provider 12, a network 16 coupled to the content provider 12 and/or the digital rights issuer 14, and an upstream distribution system 18 coupled to the network 16. The content provider 12, the digital rights issuer 14, the network 16 and the upstream distribution system 18 are part of an upstream system or an upstream DRM system, which, in general, is the DRM system or portion of the DRM system in which the content originates or from which the content is distributed.

The system 10 also includes a Limited Rights Issuer (LRI) 22 and a Domain Authority (DA) 24, both of which can be part of a downstream distribution system, shown generally as 26, which is coupled to the upstream distribution system 18. As will be discussed in greater detail hereinbelow, the LRI 22 translates upstream licenses and protected content and issues licenses and other digital rights to one or more of the end user communication devices in the downstream system. Translation is the process that takes upstream licenses and protected content and makes that information available in the downstream DRM system. Thus, at least functionally, the LRI 22 also can be considered to be part of the upstream DRM system, or at least straddling the upstream and downstream systems. Also, as will be discussed in greater detail hereinbelow, the DA 24 defines and manages the "domain," which is the set of end user communication devices that are allowed to share Domain Licenses. End user communication devices in the same domain share a key.

The system 10 also includes a network 28 that couples the downstream distribution system 26 to one or more end user communication devices 32, 34 and 36. The downstream distribution system 26, the network 28 and the end user communication devices 32, 34, 36 are part of a downstream system or downstream DRM system. In general, the downstream DRM system is the DRM system or portion of the DRM system to which the protected content is transmitted or distributed. As discussed, translation is the process that takes upstream licenses and protected content and makes that information available in the downstream DRM system.

The system 10 also includes a Remote Authority (RA) 38, which provisions the LRI 22 with various digital rights issuance information, as will be discussed in greater detail hereinbelow. Also, as will be discussed in greater detail hereinbelow, the RA 38 can provision the DA 24 with domain membership information for various end user communication devices. In general, the RA 38 can be part of or associated with the content provider 12, the digital rights issuer 14, and/or other suitable upstream DRM system component or components, although such is not necessary. Alternatively, the RA 38 can be part of or associated with one or more downstream DRM system components.

The content source or provider 12 can be any suitable transmission source of DRM-protected content, including multimedia content. For example, the content provider 12 can be an over-the-air broadcaster, from a cable television plant, satellite service provider or other content service provider, such as a telephone system. The content provider 12 can be connected to the network 16 and/or the upstream distribution system 18 via any suitable connection, e.g., one or more coaxial cables and/or optical fibers or optical fiber cables, including a Hybrid Fiber Coaxial (HFC) cable system. Other suitable connections include suitable Fiber To The Premises (FTTP) systems, such as Fiber To The Curb (FTTC) or Fiber To The Home (FTTH), or over any suitable number of digital subscriber line systems (xDSL). Also, the content provider 12 can provide DRM-protected content wirelessly, e.g., via over-the-air-broadcast from a satellite service provider or other suitable content service provider.

The content provided by the content provider 12 can be any multimedia content, including DRM-protected content, that is suitable for transmission to one or more end user communication devices. For example, multimedia content can include broadcast video, including movies, programming events, music and/or other multimedia content that is distributed, e.g., as one or more programming streams from the content provider 12 or other suitable content source. The multimedia content typically is a plurality of digital signals formatted according to a suitable standard, such as the MPEG (Moving Picture Experts Group) 2 or MPEG 4 standard, and multiplexed into a data stream that is modulated on a carrier using quadrature amplitude modulation (QAM) or other suitable modulation technique.

The digital rights issuer 14 can be any suitable system component, element and/or portion of the content provider 12 that is suitable for generating and/or providing content protection information associated with content provided by the content provider 12. In general, content protection information includes licenses and any other digital rights issuance information that enables the use of associated content under specified conditions. For example, content protection information can include privileges, permission and/or constraints regarding access to its associated content by one or more end user communication devices. Specific content protection information will be discussed hereinbelow.

One or more of the network 16, the upstream distribution system 18, the downstream distribution system 26 and the network 28 can be any communication network or network server arrangement suitable for transmitting DRM-protected content and associated rights issuance information between the content provider 12 (and rights issuer 14) and one or more of the end user communication devices 32, 34, 36. For example, one or more of the network 16, the upstream distribution system 18, the downstream distribution system 26 and the network 28 can be or include a cable television network, the Internet or an Internet protocol (IP) based or other packet-based network, or other suitable public network, including a telephone network. Also, one or more of the network 16, the upstream distribution system 18, the downstream distribution system 26 and the network 28 can be or include a computer network, a web-based network or other suitable wired or wireless network or network system. Thus, one or more connections between any one or more of the network 16, the upstream distribution system 18, the downstream distribution system 26 and the network 28 can be or include one or more coaxial cables and/or optical fibers, including a Hybrid Fiber Coaxial (HFC) cable system, one or more Fiber To The Premises (FTTP) systems, such as Fiber To The Curb (FTTC) or Fiber To The Home (FTTH), over any suitable number of digital subscriber line systems (xDSL), and/or wirelessly.

One or more of the end user communication devices 32, 34, 36 can be any suitable end user communication device configured to receive, process, store, display and/or otherwise execute or consume DRM-protected content and/or associated rights issuance information. For example, one or more of the end user communication devices can be any signal converter or decoder (set-top) box, including set-top boxes with internal and/or external recording capabilities and local and/or remote storage, which often are referred to as personal video recorder (PVR) devices, digital video recorder (DVR) devices and/or digital video server (DVS) devices. Other suitable end user communication devices include residential gateways, home media server systems, digital video disk recorders, computers, televisions with built-in or added-on content receiving and storing capability, and/or other suitable computing devices or content devices, including internet protocol (IP), satellite and cable digital video recorders, and home area network (HAN) devices and systems. Also, one or more of the end user communication devices can be mobile communication devices, such as cellular telephones, smart telephones (smartphones), personal digital assistants (PDAs), digital music players (e.g., MP3 players), portable video players and/or other handheld mobile devices, media players in automobiles, laptop personal computers (PCs), notebook PCs and/or other mobile computing devices.

Each of the end user communication devices 32, 34, 36 typically includes a DRM agent (not shown), which is configured to obtain, e.g., from the LRI 22, downstream content licenses and/or other rights issuance information for items of content. The DRM agent also manages the authentication/verification of the downstream content license for a content item, the conditional access of the content item (e.g., decryption), and the enforcement of the DRM permissions specified in the downstream content license.

Figure 2:
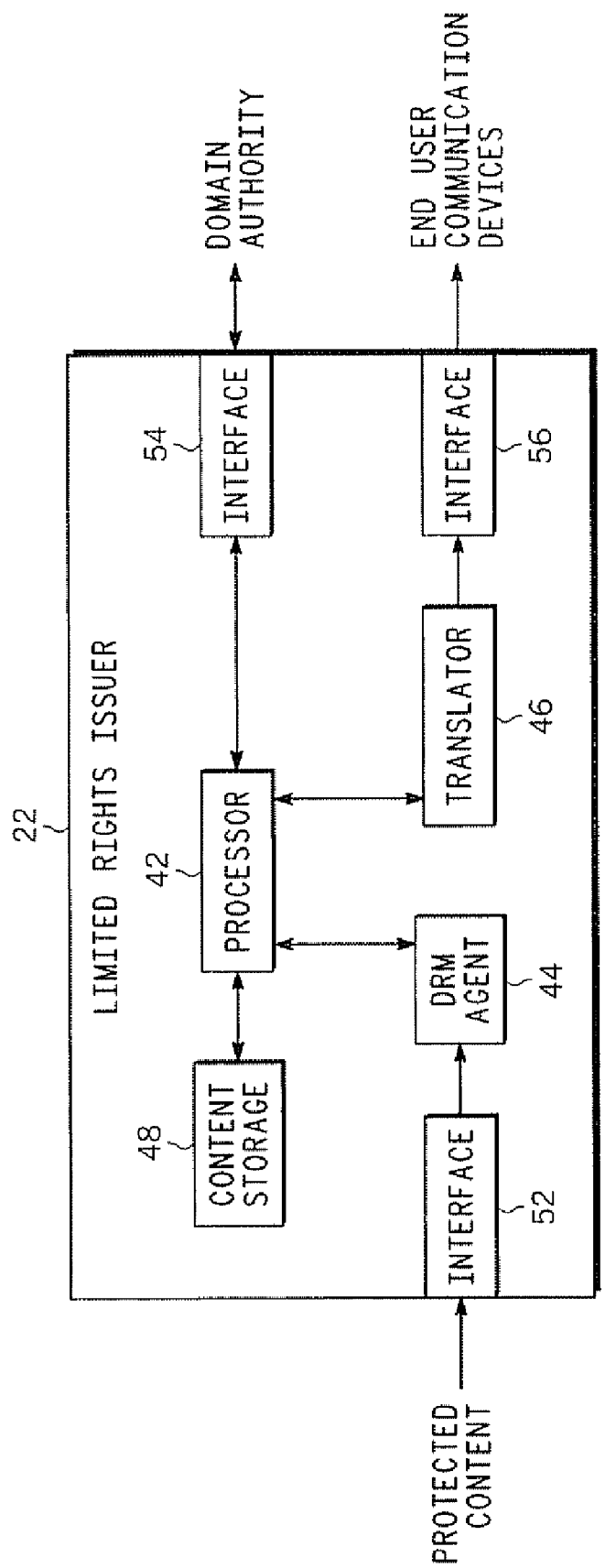
FIG. 2 is a block diagram of a Limited Rights Issuer (LRI) device for use in a system for providing content interoperability between different digital rights management schemes.

Referring now to FIG. 2, with continuing reference to FIG. 1, shown is a block diagram of the Limited Rights Issuer (LRI) device 22 used in the system 10 for providing content interoperability between different digital rights management schemes. The LRI 22 can be partially or completely any suitable device or subsystem (or portion thereof) within the downstream distribution system 26 and/or the network 28 coupled thereto. In general, the LRI 22 is responsible for receiving licenses and other digital rights issuance information from the content provider and/or other components in the upstream portion of the DRM system and controlling the issuance of those licenses and digital rights to one or more end user communication devices.

In conventional DRM systems, the functions performed by the LRI 22 in the system 10 are performed typically by several rights issuance devices and/or components within the upstream portion of the DRM system, e.g., within content provider itself 12 and/or the rights issuer 14, and/or within the network 16 and/or the upstream distribution system 18. Conventional DRM systems and subsystems do not have a device like the LRI 22, much less such a device between the upstream and downstream distribution system portions of their DRM system. In the system 10, by having the LRI 22 and by having the LRI 22 between the upstream and downstream distribution system portions of the DRM system, rights issuance can be controlled sufficiently on behalf of the content provider within a system in a manner that also allows DRM interoperability regardless of the DRM scheme of the issued content and the DRM scheme supported by the end user communication device receiving the DRM-protected content.

The LRI 22 includes a processor or controller 42, a DRM agent 44 coupled to the processor 42, a translator 46 coupled to the processor 42, and a content storage element 48 coupled to the processor 42. In general, the processor 42 processes content and associated DRM information received by the LRI 22. In addition to the content storage element 48, the processor 42 can include at least one type of memory or memory unit (not shown) and a storage unit or data storage unit coupled to the processor for storing processing instructions and/or information received by the LRI 22.

The DRM agent 44 is configured to receive content licenses and other digital rights issuance information from the upstream distribution system 18 for associated content. As discussed generally hereinabove, the DRM agent 44 manages the authentication or verification of the content license for a content item, the conditional access of the content item (e.g., decryption), and the enforcement of the DRM permissions and/or constraints specified in the content license. Such information can be characterized as DRM data or DRM information.

The translator 46 converts or generates a converted version of the licenses and/or other digital rights issuance information from a first DRM format or scheme to at least one second DRM format or scheme. For example, the translator 46 translates DRM information issued according to the DRM format used by the content provider to the DRM format supported by the particular end user communication device to which the DRM information is being transferred, at least to the extent that such DRM formats or schemes are different and/or incompatible.

The LRI 22 also can include one or more input and/or output interfaces for receiving and/or transmitting content and associated DRM information. For example, the processor 42 and other components in the LRI 22 can be coupled between a first or input interface 52, which receives content and associated DRM information from the upstream distribution system 18, and one or more second or output interfaces 54, 56, which transfer processed content and associated DRM information, including stored content and associated DRM information, to the domain authority 24 and to one or more end user communication devices, respectively. It should be understood that one or more of the interfaces 52, 54, 56 can be a single input/output interface coupled to the processor 42. Also, it should be understood that one or more of the interfaces 52, 54, 56 can be an interface configured to support more than one content provider and/or end user communication device.

One or more of the processor 42, the DRM agent 44, the translator 46, the content storage element 48 and the interfaces 52, 54, 56 can be comprised partially or completely of any suitable structure or arrangement, e.g., one or more integrated circuits. Also, it should be understood that the LRI 22 includes other components, hardware and software (not shown) that are used for the operation of other features and functions of the LRI 22 not specifically described herein.

The LRI 22 can be partially or completely configured in the form of hardware circuitry and/or other hardware components within a larger device or group of components. Alternatively, the LRI 22 can be partially or completely configured in the form of software, e.g., as processing instructions and/or one or more sets of logic or computer code. In such configuration, the logic or processing instructions typically are stored in a data storage device, e.g., the content storage element 48 or other suitable data storage device (not shown). The data storage device typically is coupled to a processor or controller, e.g., the processor 42. The processor accesses the necessary instructions from the data storage device and executes the instructions or transfers the instructions to the appropriate location within the LRI 22.

With respect to the content storage element 48, the LRI 22 may have access to a hard drive or other storage element for recording streams of multimedia content, such as video streams broadcast from the multimedia content source. However, the content storage element 48 can be any suitable information storage unit, such as any suitable magnetic storage or optical storage device, including magnetic disk drives, magnetic disks, optical drives, optical disks, and memory devices, including random access memory (RAM) devices and flash memory. Also, although the content storage element 48 is shown within the LRI 22, the content storage element 48 can be located external to the LRI 22 and suitably coupled thereto.

Figure 3:
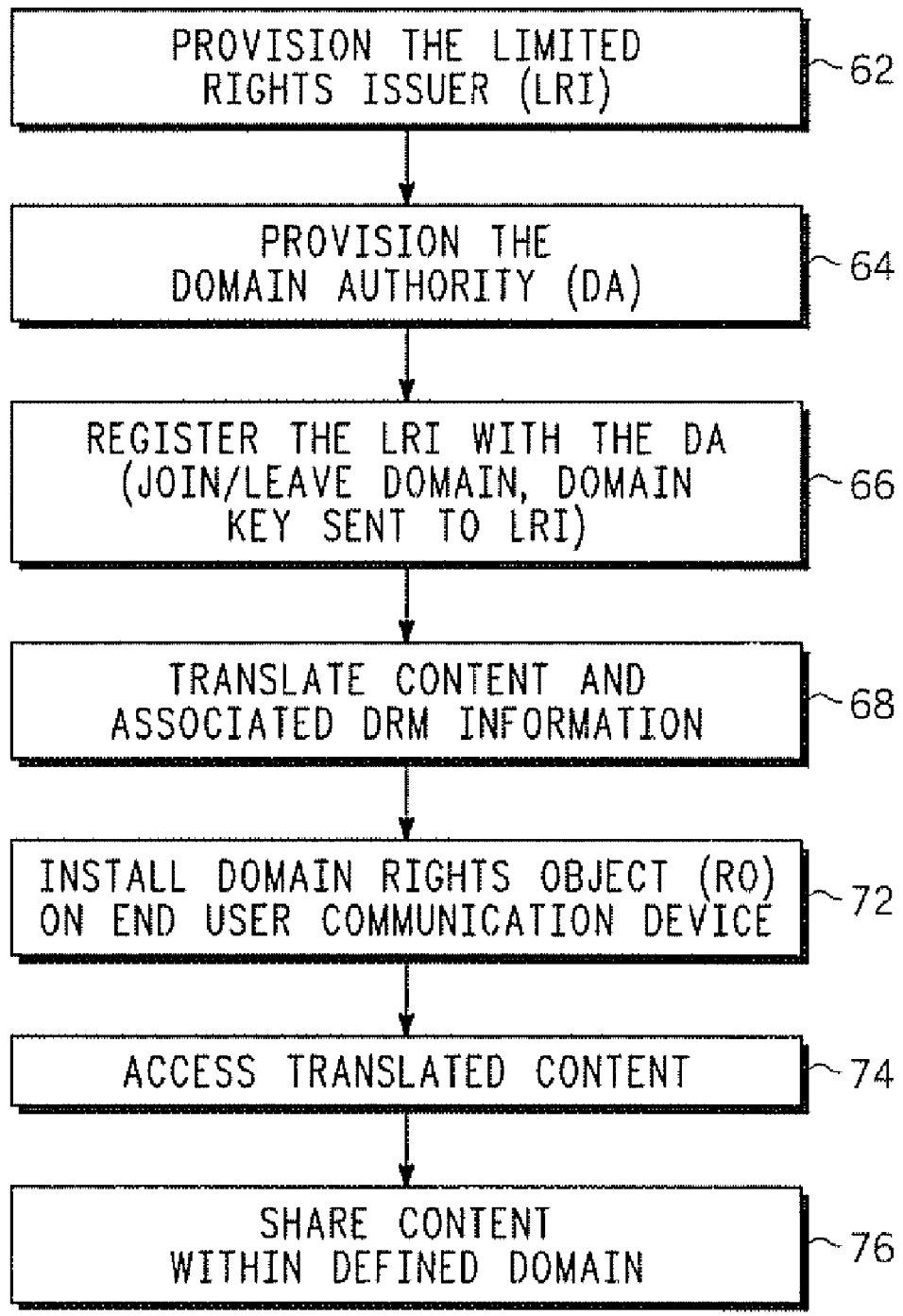
FIG. 3 is a flow chart that schematically illustrates a method for providing content interoperability between different digital rights management schemes.

Referring now to FIG. 3, with continuing reference to FIG. 1 and FIG. 2, shown is a flow chart that schematically illustrates a method 60 for providing content interoperability between different digital rights management formats or schemes. As discussed previously herein, many different DRM formats or schemes exist for protecting content. Such DRM formats or schemes include the Internet Protocol Rights Management (IPRM) format specified by Motorola, one or more Windows Media Digital Rights Management (WMDRM) formats specified by Microsoft Corporation, and one or more OMA DRM formats according to or specified by the Open Mobile Alliance (OMA). The method 60 will be described using an example in which the content provider 12 issues content and associated digital rights management information in the IPRM DRM format and at least one of the end user communication devices 32, 34, 36 supports the OMA DRM format. It should be understood that the content provider 12 can issue content and associated digital rights management information in or according to other DRM formats, and one or more of the end user communication devices 32, 34, 36 can receive content and associated digital rights management information in or according to other DRM formats.

In the OMA DRM scheme, content licenses are referred to as rights objects (ROs). Each RO is specific to an item of content and either an individually identified downstream end user communication device or an identified domain of downstream end user communication devices. The downstream end user communication devices may obtain ROs from rights issuers (RIs), such as the content digital rights issuer 14, although ROs need not necessarily be generated or distributed by an RI. However, according to the method 60, the LRI 22 functions as a rights issuer on behalf of the content digital rights issuer 14. More specifically, the LRI 22 is configured to generate and issue "translated" licenses or ROs that are equivalent to the ROs issued by the content digital rights issuer 14 and received by the LRI 22, as will be discussed in greater detail hereinbelow.

In general, in operation of the method 60, the Domain Authority (DA) provides domain management in the downstream DRM system. End user communication devices can be added to the domain of devices with communication required only between the additional downstream communication device and the DA. Unlike conventional systems, there is no need to re-issue digital rights certificates or other information to existing end user communication devices within the domain. Furthermore, the DA makes sure that access to protected content is available only to end user devices within the domain. In this manner, the DA can operate on behalf of the upstream content provider.

The method 60 includes a step 62 of provisioning the Limited Rights Issuer (LRI) 22, e.g., by the Remote Authority (RA) 38 or other suitable system component. As part of the provisioning step 62, the RA issues (i.e., creates and assigns) the LRI 22 with several pieces of DRM information, including an OMA Rights Issuer (RI) Certificate, which can be defined as Cert(LRI). The OMA RI certificate Cert(LRI), which is used to establish identity, should identify the OMA domain to which the LRI belongs (e.g. within the conventionally-established OMA <domainID> field). The RA 38 also provisions the LRI 22 with a private key corresponding to the OMA RI Certificate, as well as the identifier and the uniform resource locator (<riURL>) of the DA 24, e.g., in the conventionally-established OMA fields<riID> and <riURL>, respectively. As part of the provisioning step 62, a provisioning protocol is executed between the LRI 22 and the RA 38. As a result of the execution of the provisioning protocol, the provisioning information is securely communicated to the LRI 22 and installed thereon.

Alternatively, the method can also include a step 64 of provisioning the DA 24. For example, a back-end mechanism can establish a meta-domain membership list, which is the association between the LRI 22 and the set of devices that will be able to share translated content, e.g., the OMA devices 32, 34, 36 in this example. The membership list can be communicated from the RA 38 to the DA 24 in any suitable manner, e.g., via a secure authenticated mechanism. It should be understood that if the RA 38 does not communicate the meta-domain membership list to the DA 24, the DA 24 can use other information, such as billing records, to determine the membership of the meta-domain.

The method 60 includes a step 66 of registering the LRI 22 with the DA 24. Upon startup (or some other trigger), the LRI 22 initiates a registration protocol, e.g., an OMA registration protocol, with the DA 24. Within the downstream distribution system 26, the DA 24 is running on the OMA Rights Object Acquisition Protocol (OMA ROAP) server.

As discussed hereinabove, as part of the provisioning step 62, the LRI 22 has been provisioned with the URL of the DA 24. Once the LRI 22 has been successfully ROAP registered, the LRI 22 executes the ROAP Join Domain protocol. The OMA domain to which the LRI is requesting membership (OMA <domainID>) has been provisioned in the LRI 22 by the provisioning step 62. Successful execution of the ROAP Join Domain protocol results in a domain key (e.g., K_d) being sent to the LRI 22. The LRI 22 will use the key when generating "equivalent" licenses for the translated content, as will be discussed hereinbelow. Alternatively, the LRI 22 can be pre-provisioned with the domain key.

The method 60 includes a step 68 of translating content and associated DRM information. As part of the step 68, the OMA end user communication device of interest connects to the LRI 22 in a suitable manner, e.g., via the network 28, and identifies itself as being an OMA client device requesting content. Within the LRI 22, the controller 42 initiates the translation of the requested content that is either stored on the LRI 22 and/or available to the LRI 22, e.g., from the upstream distribution system 18.

To translate the requested content, the LRI translator 46 initially parses the protected content (e.g., the IPRM protected content) and generates an OMA DRM Content Format (DCF), which identifies the DA 24 as the Rights Issuer. To successfully identify the DA 24 as the Rights Issuer, the <riURL> field must identify the Domain Authority URL that was provisioned in the LRI 22 as part of the provisioning step 62.

The LRI translator 46 next generates a Domain RO equivalent of the content license, e.g., the IPRM license. The Domain RO is signed by the LRI 22. As discussed hereinabove, the <riID> field and the <riURL> field in the Domain RO identify the Domain Authority, i.e., the DA 24. However, the Domain RO may include another field to identify the license as a "translated" license. According to the method 60, the license is identified as a translated license so that the signature validation algorithm in the content-requesting end user communication device can validate the authenticity of the license against the LRI certificate (i.e., the certificate of the issuer of the translated license) instead of the Domain Authority certificate, as would be done in conventional systems.

Next, the LRI 22 passes the OMA DCF and the Domain RO to the OMA client, i.e., the end user communication device requesting content. The OMA DCF and the Domain RO information is passed to the end user communication device using any suitable means of information transport that is available, e.g., using Universal Serial Bus (USB) mass storage. For convenience, the Domain RO can be embedded in the OMA DCF, rather than transferred as separate information.

Finally, the LRI 22 transfers or pushes the Domain RO equivalent of the content license (i.e., the LRI certificate) to the content-requesting end user communication device. As with the OMA DCF and the Domain RO, the LRI certificate is transported to the end user communication device using any suitable means of information transport available.

The method 60 includes a step 72 of the content-requesting end user communication device installing the translated domain RO. The end user communication device initially validates the received LRI certificate. Once it has validated the LRI certificate, the end user communication device processes the domain RO, e.g., in a conventional manner, with a few exceptions. First, when verifying the domain RO signature (i.e., the authenticity of the domain RO), the end user communication device verifies the domain RO signature against the LRI certificate rather than the DA certificate, as would be done in a conventional system. Second, the end user communication device also verifies that the domain RO has been issued for a domain that is identified in the LRI certificate, e.g., via the OMA <domainID> field.

It should be understood that processing the domain RO by the end user communication device may result in the end user communication device initiating the OMA ROAP Registration protocol and then the ROAP Join Domain protocol with the DA 24. That is, the content-requesting end user communication device may request the DA 24 that the communication device be allowed to join (or leave) the domain of end user communication devices allowed to received the requested content. The OMA domain to which the LRI 22 requests membership is identified in the RO. When the DA 24 receives a request by an end user communication device to join the "meta-domain," the DA 24 determines if the requesting end user communication device should be permitted to join the meta-domain. Such determination can be made by consulting the membership list that was provided to the DA 24 during registration (i.e., step 66). Alternatively, as discussed previously herein, such determination can be made by consulting some back-end mechanism, such as billing records or other suitable information.

The method 60 includes a step 74 of the content-requesting end user communication device accessing the translated content. Such access can be performed, e.g., in a conventional manner. For example, typically, the end user communication device includes a processor or controller (not shown) and an input interface (not shown) for receiving the translated content and transferring the received content to the processor. The end user communication device also may include one or more other receiving components (not shown), such as a radio frequency (RF) tuner, a QAM demodulator, an MPEG stream demultiplexor and a conditional access decryptor or decrypting module.

The method 60 can also include a step 76 of the (first) content-requesting end user communication device sharing accessed content with other (second) content-requesting end user communication devices within the defined domain. The sharing step 76 includes the first end user communication device sending the domain RO, the DCF and the LRI certificate it has previously received and stored thereon to the second content-requesting end user communication device. The second end user communication device then installs the domain RO, e.g., as per the installation step 72, described hereinabove. The second end user communication device then can access the translated content, e.g., as per the access step 74, described hereinabove.

As discussed hereinabove, conventional DRM systems do not have a device like the LRI 22 in the upstream or downstream distribution system portions of their DRM system. Therefore, functions performed by the LRI 22 in the system 10 are performed in conventional DRM systems by one or more rights issuance devices and/or components within the content provider itself and/or within the right issuer itself. In the system 10, the LRI 22 allows rights issuance to be controlled sufficiently on behalf of the content provider within a system that also allows DRM interoperability regardless of the DRM scheme of the issued content and the DRM scheme supported by the end user communication device receiving the DRM-protected content.

The method shown in FIG. 3 may be implemented in a general, multi-purpose or single purpose processor. Such a processor will execute instructions, either at the assembly, compiled or machine-level, to perform that process. Those instructions can be written by one of ordinary skill in the art following the description of FIG. 3 and stored or transmitted on a computer readable medium. The instructions may also be created using source code or any other known computer-aided design tool. A computer readable medium may be any medium capable of carrying those instructions and includes random access memory (RAM), dynamic RAM (DRAM), flash memory, read-only memory (ROM), compact disk ROM (CD-ROM), digital video disks (DVDs), magnetic disks or tapes, optical disks or other disks, silicon memory (e.g., removable, non-removable, volatile or non-volatile), packetized or non-packetized wireline or wireless transmission signals.

It will be apparent to those skilled in the art that many changes and substitutions can be made to the systems, devices and methods for providing content interoperability between different digital rights management schemes herein described without departing from the spirit and scope of the invention as defined by the appended claims and their full scope of equivalents.

The invention claimed is:

1. A method for processing content protected according to a first digital rights management format for access by at least one end user communication device configured to support a second digital rights management format, comprising the steps of:

providing a Domain Authority configured for defining and managing a domain of end user communication devices allowed to share at least a portion of the protected content;

providing a Limited Rights Issuer configured for receiving content and digital rights management information in the first digital rights management format and for issuing content and digital rights management information in the second digital rights management format to at least one end user communication device within the domain of end user communication devices defined by the Domain Authority;

registering the Limited Rights Issuer with the Domain Authority in such a way that the Limited Rights Issuer is associated with the defined domain and issued a domain key, wherein the Limited Rights Issuer uses the domain key to generate at least a portion of the digital rights management information that allows end user communication devices within the defined domain to access protected content;

translating content and digital rights management information in the first digital rights management format received by the Limited Rights Issuer to content and digital rights management information in the second digital rights management format;

installing translated content and digital rights management information in the second digital rights management format from the Limited Rights Issuer to at least one end user communication device within the defined domain; and accessing the translated content in the second digital rights management format using the digital rights management information in the second digital rights management format by at least one end user communication device on which the translated content and associated digital rights management information was installed.

2. The method as recited in claim 1, wherein the translating step includes the Limited Rights Issuer generating translated digital rights management information in the second digital rights management format that is equivalent to the received digital rights management information in the first digital rights management format, and the Limited Rights Issuer transferring the translated content and the translated digital rights management information in the second digital rights management format to the end user communication device.

3. The method as recited in claim 1, further comprising the step of, prior to installing the translated content, validating the authenticity of the digital rights management information in the second digital rights management format received from the Limited Rights Issuer using an authenticity certificate generated by the Limited Rights Issuer.

4. The method as recited in claim 1, wherein the Limited Rights Issuer generates an authenticity certificate identifying the defined domain associated with the Limited Rights Issuer, and wherein the method further comprises the step of, prior to installing the translated content, verifying against the authenticity certificate generated by the Limited Rights Issuer that the digital rights management information in the second digital rights management format received from the Limited Rights Issuer has been issued for the defined domain associated with the Limited Rights Issuer.

5. The method as recited in claim 1, wherein the registering step includes the Limited Rights Issuer initiating a registration protocol with the Domain Authority, the Limited Rights Issuer initiating a request to join the domain defined by the Domain Authority if the Limited Rights Issuer is allowed to register with the Domain Authority, and the Domain Authority issuing a domain key to the Limited Rights Issuer if the Limited Rights Issuer is allowed to join the domain.

6. The method as recited in claim 1, further comprising the step of at least one end user communication device requesting the Domain Authority that the end user communication device be allowed to join the domain of end user communication devices allowed to share at least a portion of the protected content.

7. The method as recited in claim 1, further comprising the step of provisioning the Limited Rights Issuer with provisioning information, wherein the provisioning information includes digital rights management information that allows an end user communication device to access content protected by the digital rights management information.

8. The method as recited in claim 6, wherein the provisioning step is performed by a Remote Authority coupled to the Limited Rights Issuer.

9. The method as recited in claim 1, further comprising the step of provisioning the Domain Authority with domain membership information, wherein the domain membership information includes which end user communication devices are allowed to share at least a portion of the protected content.

10. The method as recited in claim 8, wherein the provisioning step is performed by a Remote Authority coupled to the Domain Authority.

11. A method for accessing protected content issued from an upstream digital rights management system in a first digital rights management format by at least one end user communication device in a downstream digital rights management system and configured to support a second digital rights management format, comprising the steps of:

receiving, by the end user communication device, content and digital rights management information that has been translated by a Limited Rights Issuer from the first digital rights management format to the second digital rights management format, wherein the Limited Rights Issuer is registered with a Domain Authority in such a way that the Limited Rights Issuer is issued a domain key associated with a defined domain of end user communication devices, by the Domain Authority;

receiving, by the end user communication device, an authenticity certificate from the Limited Rights Issuer, wherein the authenticity certificate is signed by the Limited Rights Issuer;

validating the authenticity of the received translated digital rights management information in the second digital rights format using the received authenticity certificate;

if the authenticity of the received translated digital rights management information in the second digital rights format is validated, installing the received translated digital rights management information in the second digital rights format; and accessing the received content in the second digital rights format using the installed translated digital rights management information in the second digital rights format.

12. The method as recited in claim 11, further comprising the step of the end user communication device requesting the Domain Authority to allow the end user communication device to join a domain defined by the Domain Authority, wherein the Limited Rights Issuer is registered with the domain in such a way that the Limited Rights Issuer is allowed to transfer content and associated digital rights management information to end user communication devices within the domain.

13. The method as recited in claim 11, wherein the digital rights management information received by the end user communication device includes a domain license, and wherein the validating step includes validating the domain license using the authenticity certificate received from the Limited Rights Issuer.

14. The method as recited in claim 11, wherein the authenticity certificate identifying a defined domain of end user communication devices associated with the Limited Rights Issuer, and wherein the validating step includes verifying against the authenticity certificate that the received digital rights management information in the second digital rights management format has been issued for the defined domain associated with the Limited Rights Issuer.

15. The method as recited in claim 11, further comprising the step of the end user communication device sharing the translated content and digital rights management information with at least one other end user communication device in the domain defined by the Domain Authority.

16. A Limited Rights Issuance hardware device for providing content protected according to a first digital rights management (DRM) format to at least one end user communication device configured to support a second digital rights management format, comprising:
- a processor configured to register the device with a Domain Authority in such a way that the device is associated with a domain defined by the Domain Authority of at least one end user communication device in a downstream digital rights management system and the device is issued a domain key by the Domain Authority;
- a DRM agent coupled to the processor for receiving content and digital rights management information in the first digital rights management format from an upstream digital rights management system and transferring such information to the controller; and
- a translator coupled to the controller for translating, in response to the processor registering the device with the Domain Authority, at least a portion of the content and digital rights management information in the first digital rights management format to content and digital rights management information in the second digital rights management format to produce translated content and digital rights management information, using the domain key,
- wherein the translated content and digital rights management information is formatted in such a way that it accessible by at least one end user communication device within the domain of end user communication devices defined by the Domain Authority,
- wherein the device is configured to install the translated content and digital rights management information to at least one end user communication device within the domain defined by the Domain Authority in response to a request by the end user communication device for access to the translated content and digital rights management information.

17. The device as recited in claim 16, wherein the device is configured to provide validation information for at least a portion of the digital rights management information transferred from the device to a first end user communication device, in response to a validation request by the first end user communication device.

18. The device as recited in claim 16, wherein the device is configured to register the device with the Domain Authority by initiating a registration protocol with the Domain Authority, and wherein the device is configured to receive the domain key from the Domain Authority if the device is allowed to join the domain defined by the Domain Authority.

19. The device as recited in claim 16, wherein the device is configured to be provisioned with provisioning information by a Remote Authority coupled to the device, wherein the provisioning information includes digital rights management information that allows an end user communication device to access content protected by the digital rights management information.

20. The device as recited in claim 16, wherein the end user communication device is selected from the group consisting of a signal converter box, a signal decoder box, a digital video recorder, a digital video disk recorder, a personal video recorder device, a home media server, a digital video server, a residential gateway, a video receiver, a computer, a cellular telephone, a smart telephone, a personal digital assistant (PDA), a digital music player, a portable video player, a wireless handheld device, a digital camera, a mobile communication device, a laptop personal computer (PC), a notebook PC and a mobile computing device.

* * * * *